United States Patent
Choi et al.

(10) Patent No.: US 8,218,662 B2
(45) Date of Patent: Jul. 10, 2012

(54) METHOD FOR DESIGNING MINI RESOURCE UNIT AND TRANSMISSION FOR A DISTRIBUTED RESOURCE UNIT IN CONSIDERATION OF SPACE FREQUENCY BLOCK CODE

(75) Inventors: Jin Soo Choi, Anyang-si (KR); Wook Bong Lee, Anyang-si (KR); Han Gyu Cho, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 12/421,904

(22) Filed: Apr. 10, 2009

(65) Prior Publication Data

US 2009/0285168 A1 Nov. 19, 2009

Related U.S. Application Data

(60) Provisional application No. 61/044,059, filed on Apr. 11, 2008, provisional application No. 61/047,417, filed on Apr. 23, 2008, provisional application No. 61/051,359, filed on May 8, 2008, provisional application No. 61/054,461, filed on May 19, 2008.

(30) Foreign Application Priority Data

Apr. 3, 2009 (KR) .......................... 10-2009-0028898

(51) Int. Cl.
H04L 27/28 (2006.01)
(52) U.S. Cl. ...................................... 375/260
(58) Field of Classification Search ................... 375/260; 455/452.2; 370/329
See application file for complete search history.

(56) References Cited

U.S. PATENT DOCUMENTS

| 2006/0148408 A1 | 7/2006 | Cho et al. | |
| 2007/0098095 A1* | 5/2007 | Kim et al. | 375/260 |
| 2008/0232319 A1* | 9/2008 | Son et al. | 370/329 |
| 2009/0088177 A1* | 4/2009 | Yang et al. | 455/452.2 |
| 2010/0118991 A1* | 5/2010 | Lee et al. | 375/260 |

FOREIGN PATENT DOCUMENTS

RU 2 304 355 C1 8/2007

OTHER PUBLICATIONS

Choi et al., "Physical Resource Allocation Unit in IEEE 802.16m Downlink", IEEE 802.16 Broadband Wireless Access Working Group, Mar. 10, 2008, XP007915451.
Murias et al., "802.16m DL PHY Structure Baseline Content Suitable for Use in 802.16m SDD", No. 802, IEEE 802.16 Broadband Wireless Access Working Group, May 14, 2008, XP007915435.

\* cited by examiner

*Primary Examiner* — Sam K Ahn
(74) *Attorney, Agent, or Firm* — Birch, Stewart, Kolasch & Birch, LLP

(57) ABSTRACT

A method and device for wirelessly communicating between a mobile communication terminal and a base station, including exchanging one or more resource units between the base station and the mobile communication terminal, each resource unit having 18 subcarriers by a plurality of Orthogonal Frequency Division Multiple Access (OFDMA) symbols. The one or more resource units are permutated using X contiguous subcarriers as a permutation unit in each OFDMA symbol, wherein X is a positive integer that is a multiple of 2 as well as a divisor of 18.

20 Claims, 16 Drawing Sheets

METHOD FOR DESIGNING MINI RESOURCE UNIT AND TRANSMISSION FOR A DISTRIBUTED RESOURCE UNIT IN CONSIDERATION OF SPACE FREQUENCY BLOCK CODE

CROSS REFERENCE TO RELATED APPLICATIONS

The present application claims priority to U.S. Provisional Application Ser. Nos. 61/044,059, filed on Apr. 11, 2008, 61/047,417, filed on Apr. 23, 2008, 61/051,359, filed on May 8, 2008, and 61/054,461, filed on May 19, 2008, the entire contents of which are incorporated herein by reference.

This application claims the benefit of the Korean Patent Application No. 10-2009-0028898, filed on Apr. 3, 2009, which is hereby incorporated by reference as if fully set forth herein.

BACKGROUND OF THE INVENTION

1. Field of the Invention

The present invention relates to a wideband wireless mobile communication system supporting SFBC (Space Frequency Block Coding).

2. Discussion of the Background Art

Fading is the distortion that a carrier-modulated telecommunication signal experiences over certain propagation media. A fading channel is a communication channel that experiences fading. In wireless systems, fading is due to multi-path propagation and is sometimes referred to as multipath induced fading.

In wireless communications, the presence of reflectors in the environment surrounding a transmitter and receiver creates multiple paths that a transmitted signal can traverse. As a result, the receiver sees the superposition of multiple copies of the transmitted signal, each traversing a different path. Each signal copy will experience differences in attenuation, delay and phase shift while traveling from the source to the receiver. This can result in either constructive or destructive interference, amplifying or attenuating the signal power seen at the receiver. Strong destructive interference is frequently referred to as a deep fade and may result in temporary failure of communication due to a severe drop in the channel signal-to-noise ratio.

In telecommunications, a diversity scheme refers to a method for improving the reliability of a message signal by utilizing two or more communication channels with different characteristics. Diversity plays an important role in combating fading and co-channel interference and avoiding error bursts. Diversity exists because individual channels experience different levels of fading and interference. Multiple versions of the same signal may be transmitted and/or received and combined in the receiver. Alternatively, a redundant forward error correction code may be added and different parts of the message transmitted over different channels. Diversity techniques may exploit the multipath propagation, resulting in a diversity gain, often measured in decibels.

Diversity scheme can be classified into time diversity, frequency diversity, space diversity, polarization diversity, multi-user diversity, and cooperative diversity. For time diversity among these, multiple versions of the same signal are transmitted at different time instants. Alternatively, a redundant forward error correction code is added and the message is spread in time by means of bit-interleaving before it is transmitted. Thus, error bursts are avoided, which simplifies the error correction. For frequency diversity, the signal is transferred using several frequency channels or spread over a wide spectrum that is affected by frequency-selective fading.

In a broadband wireless mobile communication system, resources can be allocated in distributed manner for transmission to have frequency diversity gain. Strategies for distributed allocation of resources can be different according to the combinations of the number of DRUs (Distributed Resource Units) assigned to a user and the available bandwidth for forming DRUs for the user. The number of DRUs assigned to a user is proportional to the packet size allocated to the user, and the available bandwidth for forming DRUs is proportional to the number of LRUs (Logical Resource Units) allocated to the user.

FIG. 1 illustrates possible combinations of a packet size and the number of LRUs (the available bandwidth) for forming DRUs.

Region 1 of FIG. 1 represents the combination of small amount of available bandwidth and large packet size, and Region 3 represents the combination of large amount of available bandwidth and large packet size. In Region 1 and Region 3, performance difference between possible distributed resource allocation strategies is negligible because the packet size is large in these regions so that the packet is more likely to spread over frequency.

However, even in region 4, performance difference between possible distributed resource allocation strategies would not be significant if the size of a fractional PRU (Physical Resource Unit) or MRU (Mini physical Resource Unit) is small, because a number of MRUs of small size can be allocated in the manner that the MRUs spread over frequency axis due to large available bandwidth for forming DRUs. Therefore, in terms of diversity gain, the smaller a MRU size is, the better a system performance becomes. Therefore, generally one sub-carrier as the minimum unit for forming the DRU can obtain more diversity gain than other structure for the minimum unit.

However, designing a MRU as a minimum unit for forming a DRU should be approached in view of flexibility as well as diversity because a wireless mobile communication system may support various sub-frame configurations. For example, a communication system may adopt FFR (Fractional Frequency Reuse) and FDM (Frequency Division Multiplexing) of DRU and CRU (contiguous resource unit). Also in some configuration, there exist those sub-frame configurations where STBC (Space-Time Block Code) is not suitable for data transmission. STBC is not suitable for a sub-frame having "odd" number of symbols. In TDD (Time Division Duplexing) mode, a total of odd number of symbols may be allocated for an irregular sub-frames (5 symbols) for TTG (Transmission Transition Gap), for a sub-frame including preamble, for a sub-frame including mid-amble, for an irregular sub-frame with other CP (Cyclic Prefix) size (e.g., 7 symbols for 1/16 CP), for a sub-frame including TDM MAP (Time Division Multiplexing), etc. In FDD (Frequency Division Duplexing) mode, a total of odd number of symbols may be allocated for a sub-frame including preamble, a sub-frame including mid-amble, an irregular sub-frame with other CP size (e.g., 7 symbols for 1/16 CP), a sub-frame including TDM MAP, etc.

Although STBC is not suitable for many sub-frame configurations, SFBC (Spatial Frequency Block Coding) can support all the sub-frame configurations. Therefore, as discovered by the present inventors, a need has arisen to create a structure for the minimum unit for forming a DRU for replacing STBC by SFBC or to support both STBC and SFBC, in consideration of diversity gain performance.

SUMMARY OF THE INVENTION

The technical problem to be solved by the present invention concerns how to decide the size of the minimum unit for forming a DRU provides strong diversity gain and that supports a SFBC MIMO operations and to transmit the DRUs.

In an aspect of the invention, there is a method of wirelessly communicating between a mobile communication terminal and a base station. The method includes exchanging a physical resource unit (PRU) between the base station and the mobile communication terminal, the PRU having a plurality of OFDMA symbols. Each $l^{th}$ OFDMA symbol includes $n_l$ pilots allocated in accordance with a predetermined pilot allocation scheme, the remaining $L_{DRU} \cdot (P_{sc}-n_l)$ data subcarriers of the $l^{th}$ OFDMA symbol renumbered in order, from 0 to $L_{DRU}(P_{sc}-n_l)-1$, with logically contiguous renumbered subcarriers being grouped into $L_{DRU} \cdot L_{pair,1}$ tone pairs and the tone pairs being renumbered 0 to $L_{DRU} \cdot L_{pair,1}-1$, and the logically contiguous tone pairs $(i \cdot L_{pair,1}; (i+1) \cdot L_{pair,1}-1)$ having a predetermined permutation formula applied to be permuted and mapped into $i^{th}$ distributed LRUs, where $i=0, 1, \ldots, L_{DRU}-1$. $L_{DRU}$=number of DRUs, $P_{sc}$=number of subcarriers within an OFDMA symbol in the PRU, $L_{pair,1}=(P_{sc}-n_1)/2$.

In an aspect of the invention, there is a method of wirelessly communicating between a mobile communication terminal and a base station. The method includes exchanging a physical resource unit (PRU) between the base station and the mobile communication terminal, the PRU having a plurality of OFDMA symbols. For each l-th OFDMA symbol in the subframe, the $n_l$ pilots within each DRU are allocated in accordance with a predetermined pilot allocation scheme. Denote the data subcarriers of $DRU_{FPi}[j]$ in the l-th OFDMA symbol as $SC\_DRU_{FPi[j],l}[n]$, $0 \leq j < L_{DRU,FPi}$, and $0 \leq n < L_{SC,l}$, where $DRU_{FPi}[\bullet]$ indicates DRUs in ith frequency partition and $L_{DRU,FPi}$ indicates the number of $DRU_{FPi}[\bullet]$ included in i-th frequency partition and $L_{SC,l}$ indicates the number of data subcarriers in l-th OFDMA symbol within a PRU i.e., $L_{SC,l}=Psc-n_l$ that Psc means the number of subcarrier within one OFDMA symbol of a PRU. Renumber the $L_{DRU,FPi} \cdot L_{SC,l}$ data subcarriers of the DRUs in order, from 0 to $L_{DRU,FPi} \cdot L_{SC,l}-1$. Group these contiguous and logically renumbered subcarriers into $L_{DRU,FPi} \cdot L_{SP,l}$ pairs and renumber them from 0 to $L_{DRU,FPi} \cdot L_{SP,l}-1$, where $L_{SP,l}$ indicates the number of data subcarrier-pairs in the l-th OFDMA symbol within a PRU and is equal to $L_{SC,l}/2$ ($L_{SP,l}=L_{SC,l}/2$). The renumbered subcarrier pairs in the l-th OFDMA symbol are denoted by $RSP_{FPi,l}[u]$ that equals $\{SC\_DRU_{FPi[j],l}[2v], SC\_DRU_{FPi[j],l}[2v+1]\}$, $0 \leq u < L_{DRU,FPi} \cdot L_{SP,l}$, where j=floor $(u/L_{SP,l})$ and v=u mod $L_{SP,l}$. The predetermined permutation formula map $RSP_{FPi,l}[u]$ into the s-th distributed LRUs, s=0, 1, ..., $L_{DRU,FPi}-1$.

In another aspect, the step of exchanging includes transmitting the PRU from the base station to the mobile communication terminal.

In another aspect, the step of exchanging includes receiving the PRU at the mobile communication terminal from the base station.

In another aspect, the predetermined permutation formula is pair (s, m, l, t)=$L_{DRU} \cdot f(m, s)+g(PermSeq( ), s, m, l, t)$, for an $s^{th}$ distributed LRU of a $t^{th}$ subframe, where l=0, 1, ..., $N_{sym}-1$, where pair (s, m, l, t) is a tone-pair index of an $m^{th}$ tone pair ($0 \leq m < L_{pair,l}$) in an $l^{th}$ OFDMA symbol ($0 \leq l < N_{sym}$) in a $s^{th}$ distributed LRU of the $t^{th}$ subframe; t is a subframe index with respect to the frame, s is a distributed LRU index ($0 \leq s < L_{DRU}$), m is a tone pair index within the $l^{th}$ OFDMA symbol, and PermSeq( ) is a permutation sequence generated by a predetermined function or a lookup table.

In another aspect, the predetermined permutation formula is given by $SC\_DRU_{FPi[j],l}[m]=RSP_{FPi,l}[k]$, and k is $L_{DRU,FPi} \cdot f(m, s)+g(PermSeq( ), s, m, l, t)$ where is the m-th subcarrier pair in the l-th OFDMA symbol in the s-th distributed LRU of the t-th subframe and m is the subcarrier pair index, 0 to $L_{SP,l}-1$ and t is the subframe index with respect to the frame.

In another aspect, the step of exchanging includes for each $l^{th}$ OFDMA symbol, allocating $n_l$ pilots in accordance with a predetermined pilot allocation scheme, renumbering the remaining $L_{DRU} \cdot (P_{sc}-n_l)$ data subcarriers of the $l^{th}$ OFDMA symbol in order, from 0 to $L_{DRU}(P_{sc}-n_l)-1$, with logically contiguous renumbered subcarriers being grouped into $L_{DRU} \cdot L_{pair,1}$ tone pairs and the tone pairs being renumbered 0 to $L_{DRU} \cdot L_{pair,1}-1$, and mapping the logically contiguous tone pairs $(i \cdot L_{pair,1}; (i+1) \cdot L_{pair,1}-1)$ into $i^{th}$ distributed LRUs by applying a predetermined permutation formula, where $i=0, 1, \ldots, L_{DRU}-1$.

In another aspect, there is a communications device configured to wirelessly communicate with another device. The communications device includes a memory; and a processor operatively connected to the memory and configured to exchange a physical resource unit (PRU) with the another device. The PRU has a plurality of OFDMA symbols. Each $l^{th}$ OFDMA symbol includes: $n_l$ pilots allocated in accordance with a predetermined pilot allocation scheme, the remaining $L_{DRU} \cdot (P_{sc}-n_l)$ data subcarriers of the $l^{th}$ OFDMA symbol renumbered in order, from 0 to $L_{DRU}(P_{sc}-n_l)-1$, with logically contiguous renumbered subcarriers being grouped into $L_{DRU} \cdot L_{pair,1}$ tone pairs and the tone pairs being renumbered 0 to $L_{DRU} \cdot L_{pair,1}-1$, and the logically contiguous tone pairs $(i \cdot L_{pair,1}; (i+1) \cdot L_{pair,1}-1)$ having a predetermined permutation formula applied to be permuted and mapped into $i^{th}$ distributed LRUs, where $i=0, 1, \ldots, L_{DRU}-1$.

In another aspect, the communications device is a base station in a mobile communications network, the base station being configured to encode and transmit the PRU.

In another aspect, the communications device is a mobile communications terminal in a mobile communications network, the mobile communications terminal being configured to receive and decode the PRU.

The minimum unit for forming a DRU according to the present invention has an advantageous effect on providing a diversity gain and supporting SFBC MIMO operations.

DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

A DRU comprises sub-carriers spread across a resource allocation region. Although the minimum unit for forming the DRU may equal to one sub-carrier or a fraction of the DRU, the optimum size of the minimum unit may differ according to possible resource configurations. Hereinafter in this document, (x, y) denotes the size of a resource unit consisting of 'x' sub-carriers and 'y' OFDMA symbols.

When deciding a size of a MRU constituting a DRU, diversity gain issue should be taken into consideration. A smaller "minimum DRU forming unit (Minimum-Resource Unit; MRU)" is preferred to a larger minimum DRU forming unit because a smaller minimum DRU forming unit can achieve larger diversity gain than the larger minimum DRU forming units.

Meanwhile, when deciding a size of the MRU, the ability to support SFBC should be taken into consideration for those sub-frame configurations where STBC is not suitable for data transmission. For these sub-frame configurations, it is advantageous to use SFBC in place of STBC. Generally, at least two sub-carriers should be contiguous in order to replace STBC by SFBC, or to support both STBC and SFBC, or to support all the other sub-frame configurations.

Considering the matters discussed above, the minimum DRU forming units introduced by the present invention may include two or more sub-carriers. Hereinafter, embodiments according to the present invention are described.

According to an embodiment of the present invention, a DRU comprises 'k' MRUs. A MRU of a DRU may have a size of (2n, $N_{sym}$) if the size of PRU is ($P_{SC}$, $N_{sym}$), where '$P_{SC}$' denotes the number of sub-carriers constituting the DRU, '$N_{sym}$' denotes the number of symbols constituting the DRU, $P_{SC}$ equals to k*2n, '2n' represents the number of sub-carriers constituting the MRU, 'k' is a natural number denoting the number of MRUs included in the DRU, and 'n' is a natural number. With this MRU configuration, SFBC can be supported with the simplest permutation rule.

Figure 1:
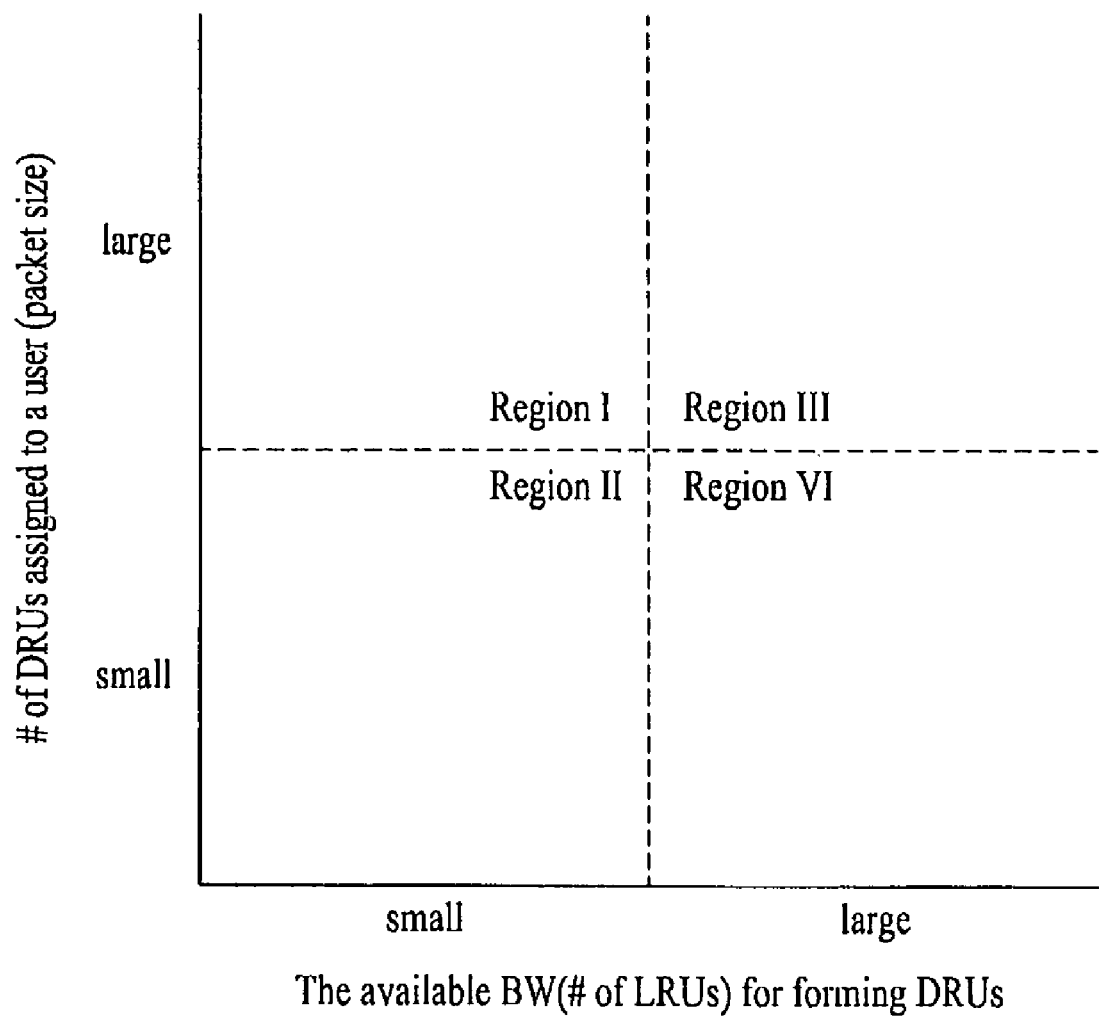
FIG. 1 illustrates a diagram for comparing performance in terms of diversity gain according to combinations of packet sizes and available bandwidths for a user.
Figure 2:
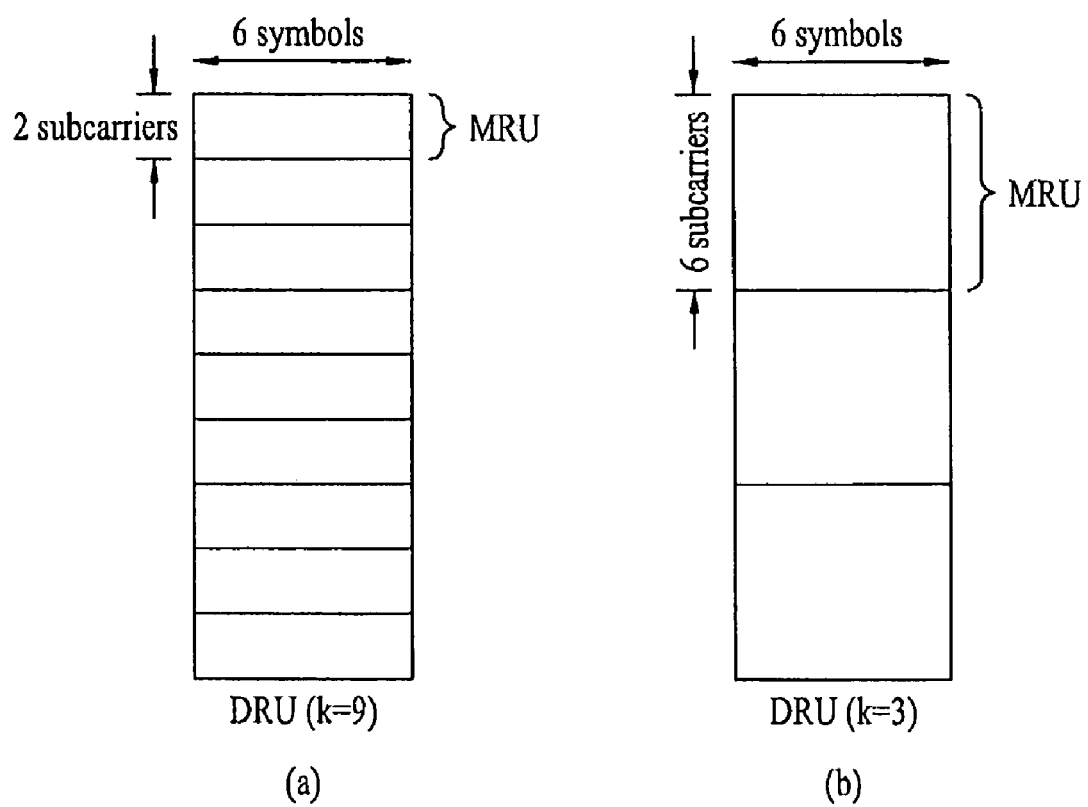
FIG. 2 illustrates exemplary DRU structures according to an embodiment of the present invention.

FIG. 2 illustrates exemplary DRU structures according to an embodiment of the present invention.

The exemplary DRU illustrated in (a) of FIG. 2 consists of 18 sub-carriers by 6 OFDMA symbols; in other words, the size of the DRU is (18, 6). The DRU consists of nine (9) MRUs (k=9). The size of each MRU is (2, 6).

The exemplary DRU illustrated in (b) of FIG. 2 consists of 18 sub-carriers by 6 OFDMA symbols; in other words, the size of the DRU is (18, 6). The DRU is comprised of three (3) MRUs (k=3). The size of each MRU is (6, 6).

For the structures of FIG. 2, permutation may be conducted in units of 6 symbols. However, it should be noted that the permutation can be conducted in any units of symbols.

According to another embodiment of the present invention, the size of a DRU is ($P_{SC}$, $N_{sym}$) and the size of a MRU is (2n, 2m), where '$P_{SC}$' denotes the number of sub-carriers constituting the DRU, '$N_{sym}$' denotes the number of symbols constituting the DRU, '2n' represents the number of sub-carriers constituting the MRU, '2m' represents the number of symbols constituting the MRU, 'n' is an integer satisfying $1 \leq n \leq P_{SC}/2$, and 'm' is an integer satisfying $1 \leq m \leq N_{sym}/2$. With this MRU configuration, two-dimensional permutation can support both SFBC and STBC.

Figure 3:
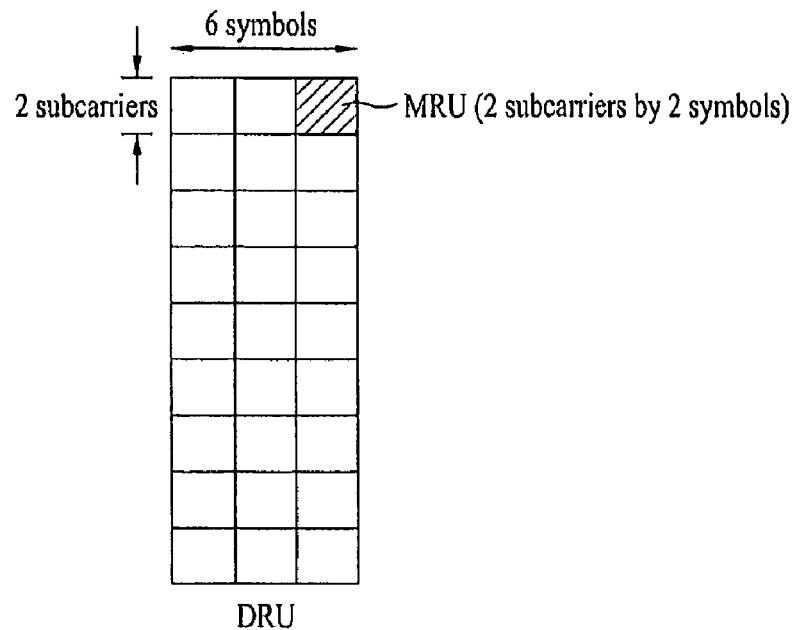
FIG. 3 illustrates an exemplary DRU structure according to an embodiment of the present invention.

FIG. 3 illustrates an exemplary DRU structure according to another embodiment of the present invention.

Referring to FIG. 3, the DRU consists of 18 sub-carriers by 6 OFDMA symbols; in other words, the size of the DRU is (18, 6). The size of a MRU constituting the DRU is (2, 2). For the case of FIG. 3, 'm' and 'n' equal to '1', respectively.

According to another embodiment of the present invention, the size of a DRU is ($P_{SC}$, $N_{sym}$), and the size of a MRU is (2n, 1), where '$P_{SC}$' denotes the number of sub-carriers constituting the DRU, '$N_{sym}$' denotes the number of symbols constituting the DRU, '2n' represents the number of sub-carriers constituting the MRU, $P_{SC}$ equals to k*2n, 'n' is a natural number, and 'k' is a natural number denoting the number of MRUs included in an OFDMA symbol of the DRU. With this MRU configuration, two-dimensional permutation can support both SFBC and STBC.

Figure 4:
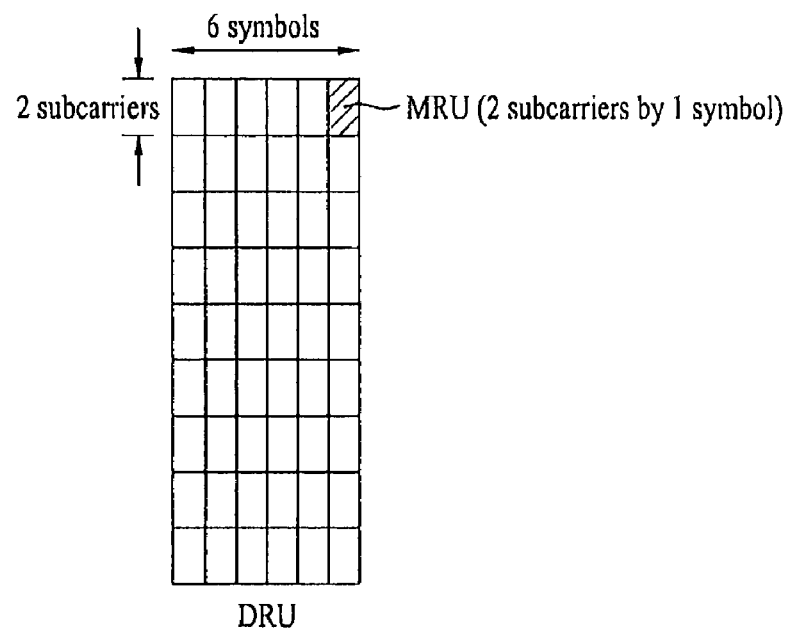
FIG. 4 illustrates an exemplary DRU structure according to an embodiment of the present invention.

FIG. 4 illustrates an exemplary DRU structure according to another embodiment of the present invention.

Referring to FIG. 4, the DRU consists of 18 sub-carriers by 6 OFDMA symbols; in other words, the size of the DRU is (18, 6). The size of a MRU constituting the DRU is (2, 1). For the case of FIG. 4, 'n' equals to '1'.

According to the present invention, MRU allocation can be performed before pilot allocation or after pilot allocation.

According to one embodiment of the present invention, all of the MRUs include two sub-carriers which are contiguous both in the physical and logical domain, on the condition that pilots are two-tone-wise paired.

Figure 5:
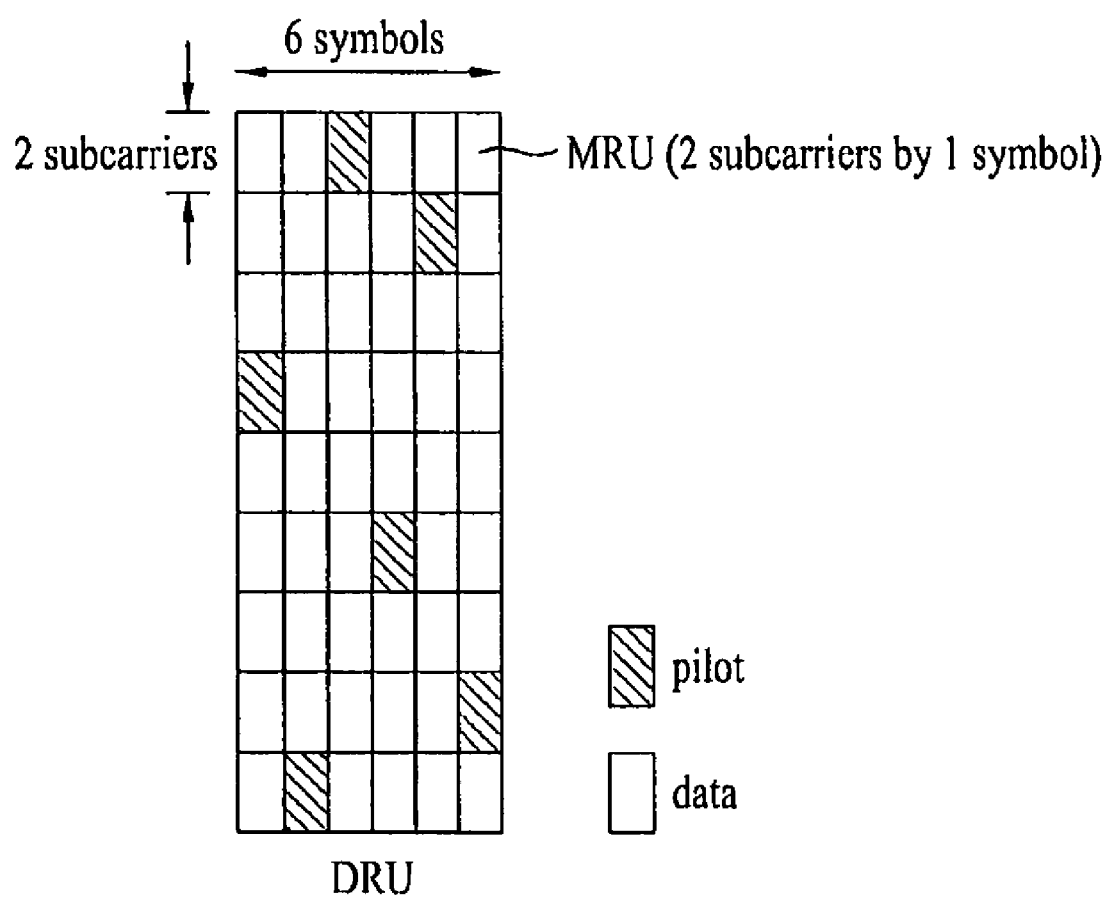
FIG. 5 illustrates an exemplary DRU structure according to an embodiment of the present invention.

FIG. 5 illustrates an exemplary DRU structure according to one embodiment of the present invention.

FIG. 5 shows that every pilot symbol is paired with another pilot symbol on a physical resource structure, and all of the MRUs have the same size accordingly. From FIG. 5, it can be easily understood that a MRU can be allocated to a DRU or a set of DRUs both before and after pilot allocation (i.e., irrespective of allocation order of data sub-carriers and pilot sub-carriers).

According to another embodiment of the present invention, at least part of the MRUs consists of two sub-carriers which are logically contiguous but not necessarily physically contiguous for the situation where pilots are not two-tone-wise paired. If pilots are not two-tone-wise paired, two (2) sub-carriers constituting a MRU may or may not be contiguous on a physical frequency domain, although the two (2) sub-carriers are contiguous on a logical frequency domain.

Figure 6A:
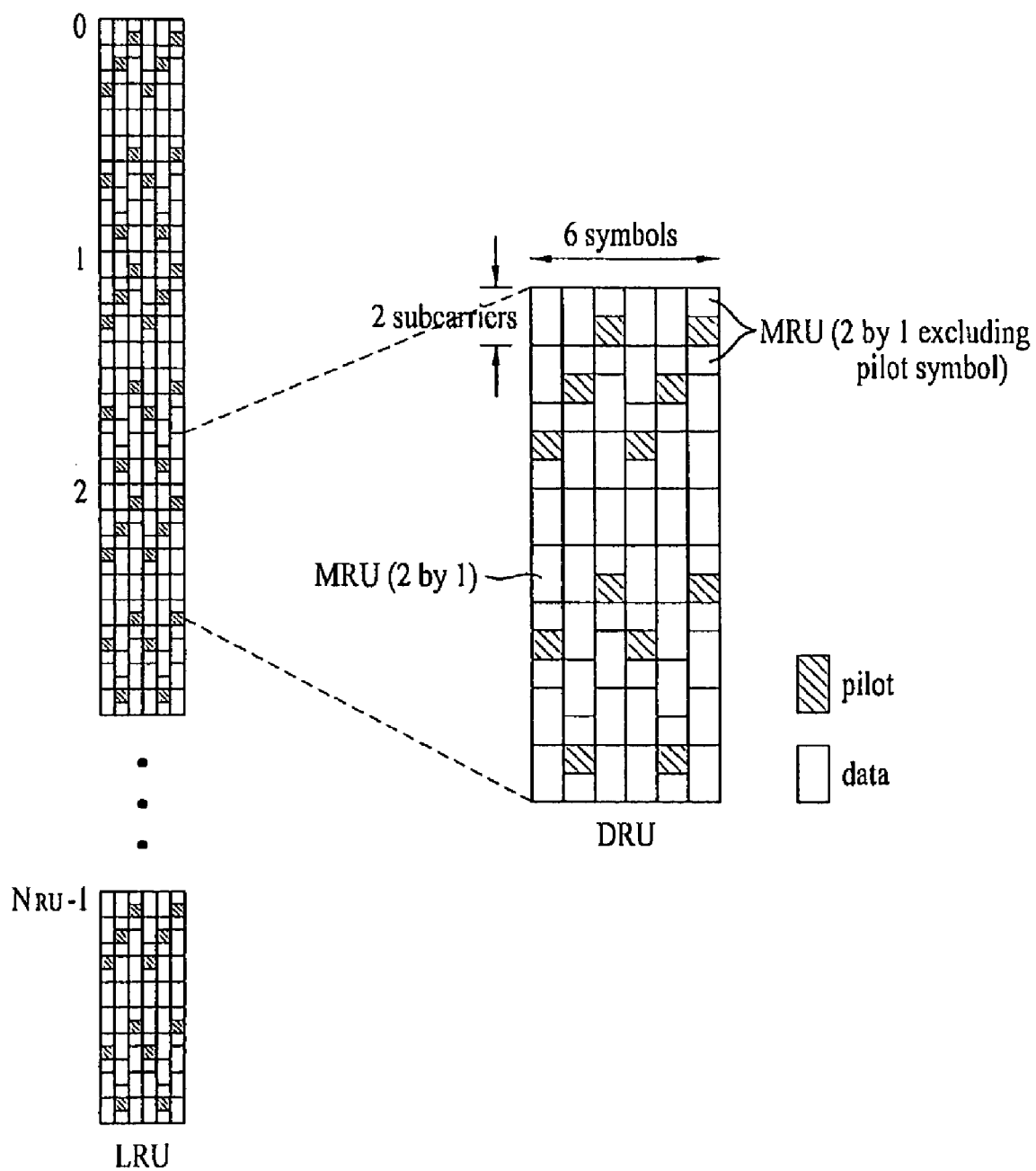
FIG. 6A illustrates another exemplary DRU structure according to an embodiment of the present invention.

FIG. 6A illustrates another exemplary DRU structure according to another embodiment of the present invention.

FIG. 6A shows that at least some pilot symbols are not paired with another pilot symbol. Therefore, there may be physical disconnection between two (2) data sub-carriers constituting a MRU.

According to one embodiment of the present invention, the permutation rule for each $l^{th}$ OFDMA symbol in a sub-frame is as follows, supposing that there are '$L_{DRU}$' LRUs (Logical Resource Units) in a distributed group (refer to FIG. 6B):

For each $l^{th}$ OFDMA symbol in the subframe:

Step S1) Allocate the $n_l$ pilots within each PRU;

Step S2) Renumber the remaining $L_{DRU} \cdot (P_{SC} - n_l)$ data sub-carriers in order, from 0 to $L_{DRU}(P_{SC}-n_l)-1$. Group these contiguous and logically renumbered subcarriers into $L_{DRU} \cdot L_{pair,l}$ pairs and renumber them from 0 to $L_{DRU} \cdot L_{pair,l} - 1$;

Step S3) Logically map contiguous tone-pairs [$i \cdot L_{pair,l}$, $(i+1) \cdot L_{pair,l} - 1$] into the $i^{th}$ distributed LRUs, $i=0, 1, \ldots$, $L_{DRU}-1$ by applying a predetermined subcarrier permutation formula.

For an $s^{th}$ distributed LRU of a $t^{th}$ subframe, the predetermined subcarrier permutation formula is given by:

pair$(s,m,l,t) = L_{DRU} \cdot f(m,s) + g(\text{PermSeq}(\ ), s, m, l, t)$, where $l=0, 1, \ldots, N_{sym}-1$, where pair $(s, m, l, t)$ is the tone-pair index of the $m^{th}$ tone pair ($0 <= m < L_{pair,l}$) in the $l^{th}$ OFDMA symbol ($0 <= l < N_{sym}$) in the $s^{th}$ distributed LRU of the $t^{th}$ subframe; t is the subframe index with respect to the frame, s is the distributed LRU index ($0 <= s < L_{DRU}$), m is the tone pair index within the $l^{th}$ OFDMA symbol, and PermSeq( ) is a permutation sequence generated by a predetermined function or lookup table.

For the exemplary DRUs of FIG. 6A, '$L_{DRU,FPi}$' equals to '6', '$n_l$' equals to '2', and '$P_{SC}$' equals to '18'. Accordingly, the permutation rule can be rewritten for FIG. 6 as follows:

1. Allocate 2 pilots in each OFDMA symbol within each PRU.

2. Renumber the remaining 6*(18−2)=96 data sub-carriers in order, from index 0 to index [6*(18−2)−1]=95.

3. The contiguous renumbered sub-carriers are grouped into [6*(18−2)]/2=48 pairs/clusters to support SFBC.

4. Apply the permutation sequence PermSeq( ) for pairs/clusters.

The concept of above described examples of FIG. 5 and FIG. 6 can be extended and generalized for a larger size of MRU. That is, if a pilot design meets the following conditions; 1) pilots are paired into 2n contiguous sub-carriers (n=1, 2, . . . ) and 2) the number of remaining data sub-carriers after pilot allocation is always paired into 2n contiguous sub-carriers (n=1, 2, . . . ); then, a MRU consists of both physically and logically contiguous sub-carriers irrespective of allocation order. On the other hand, if pilot does not satisfy the conditions above, then, a MRU consists of logically contiguous sub-carriers after allocating pilot symbols, but it is not guaranteed that a MRU consist of physically contiguous sub-carriers. That is, two data sub-carriers of a MRU after pilot allocation sometimes are not physically contiguous (they might be split only by a pilot symbol). However, these physically split subcarriers may be logically joined as a single MRU.

According to the present invention, a basic PRU may consist of one or more MRUs which are adjacent to each other in frequency axis or adjacent in time axis. Distributed allocation is supported in frequency axis when a basic PRU is divided along with frequency axis; on the other hand, distributed allocation is supported in time axis when a basic PRU is divided along with time axis. In the case that a basic PRU is divided into one or more MRUs which are adjacent to each other in time axis, MIMO (Multiple Input Multiple Output) methods such as SFBC/STBC are easy to implement because each of the MRUs has enough length in frequency axis accordingly. Preferably, a basic PRU may consist of 18 sub-carriers in frequency axis. In this case, each of the one or more MRUs may consist of even number of sub-carriers. Hereinafter, embodiments of the present invention will be described supposing that a basic PRU consists of 18 sub-carriers in frequency axis. However, it should be noted that the present invention is not limited by a specific number of sub-carriers constituting a basic PRU. In this application, the term 'sub-channelization' means the procedure of dividing a basic PRU into one or more MRUs or the resultant resource structure of a basic PRU consisting of one or more MRUs.

Sub-frames may be classified into regular sub-frames and irregular sub-frames according to the number of OFDMA symbols constituting a sub-frame. A regular sub-frame may consist of 6 OFDMA symbols and an irregular sub-frame may consist of 5 or 7 OFDMA symbols. Preferably, a basic PRU of the regular sub-frame may consist of 18 sub-carriers by 6 OFDMA symbols; on the other hand, a basic PRU of the irregular sub-frame may consist of 18 sub-carriers by 5 or 7 OFDMA symbols, respectively. In this case, a MRU constituting the basic PRU may consist of 'x' sub-carriers and 'y' OFDMA symbols, wherein 'x' is an integer value ranging from 1 to 18, and 'y' is the total number of OFDMA symbols contained in a sub-frame or a divisor of the total number of OFDMA symbols contained in a sub-frame, irrespective of the type of the sub-frame. A MRU may consist of pilot, data, and control sub-carrier. It should be noted that the present invention is not limited by the number of sub-carriers constituting a basic PRU.

According to some embodiments of the present invention, a basic PRU may be divided into '18/x' MRUs in frequency axis to support distributed allocation scheme. 'x' may preferably have a value of two (2). If x=1, which leads to namely "tone-wise sub-channelization," it is difficult to implement SFBC. Therefore, for SFBC, it is required to pair two (2) sub-carriers as one unit. In other words, a basic PRU may preferably consist of 9(=18/2) MRUs, each of which consists of 2 sub-carriers (i.e., x=2) to support distributed allocation scheme.

SFBC is applicable for a system supporting irregular sub-frames where implementing STBC is not feasible. However, in SFBC mode, distributed allocation scheme is difficult to implement when tone-wise sub-channelization (i.e., x=1) is adopted due to data sub-carrier pairing problem which is an inherent in SFBC. Therefore, according to the some embodiments of the present invention, 'x' may preferably have a value of 2, 3, 6, 9, or 18, and accordingly, the number of MRUs in a basic PRU may become 9, 6, 3, 2, or 1 for distributed allocation in the condition that all the MRUs forming the basic PRU have the same size. However, in case that all of the MRUs forming a basic PRU do not necessarily have the same size, 'x' may have any integer value ranging from 2 to 18.

Figure 7:
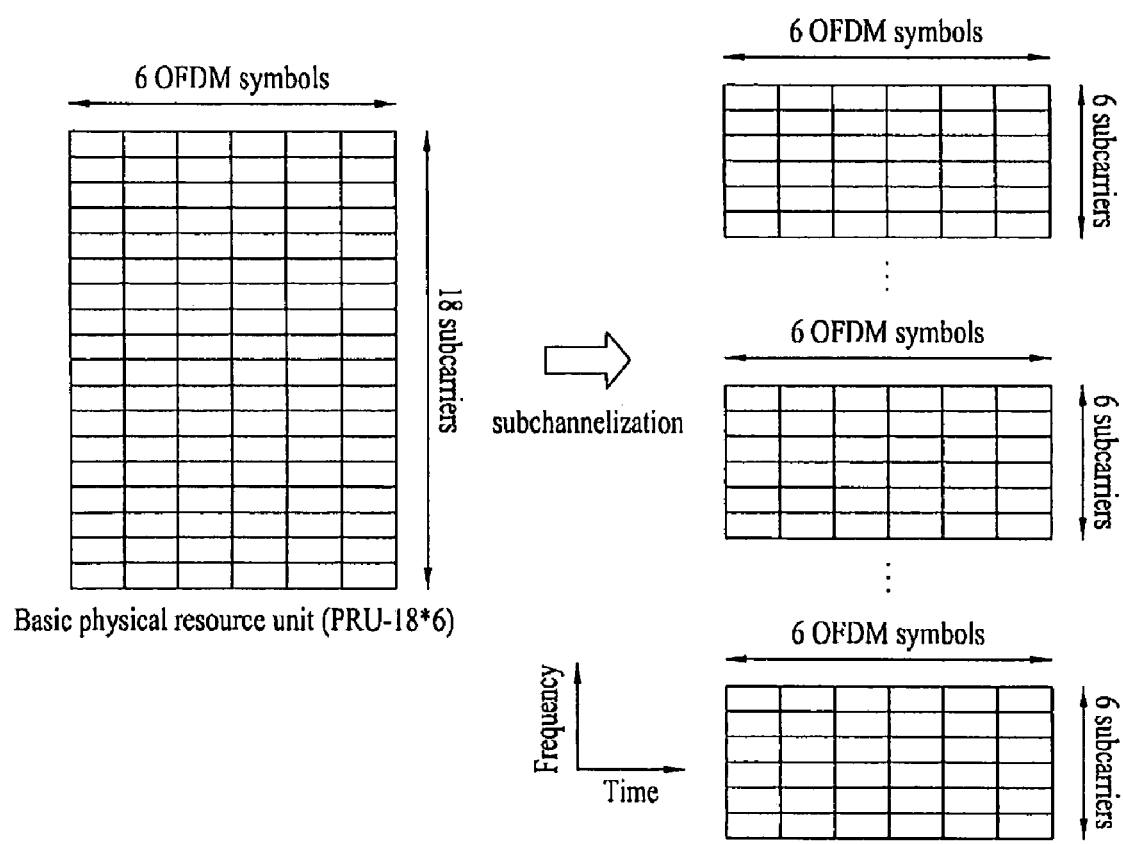
FIG. 7 illustrates a structure of a MRU for a basic PRU of regular sub-frame according to one embodiment of the present invention.

FIG. 7 illustrates a structure of a MRU for a basic PRU of regular sub-frame according to one embodiment of the present invention.

In this embodiment, a basic PRU preferably consists of 18 sub-carriers by 6 OFDMA symbols, and a MRU consists of 6 sub-carriers by 6 OFDMA symbols. Therefore, the basic PRU of size (18, 6) consists of three (3) of the MRU of size (6, 6) which are adjacent to each other in frequency axis. Referring to FIG. 7, it is shown that a MRU consists of 36 tones (=6*6). In this document, the term 'tone' represents a resource specified by 1 sub-carrier by 1 OFDMA symbol.

On the other hand, if a MRU is designed to have the size of (9, 6) so that a basic PRU of size (18, 6) consists of two (2) of the MRUs, sufficient frequency diversity may not be obtained. To the contrary, if a MRU structure is designed so that a basic PRU of size (18, 6) consists of four (4) or more of the MRUs, then overhead and/or the complexity of the system may be increased. In addition, if pilots are divided for more than as many as three (3) MRUs of a PRU, it is not feasible to support SFBC. Therefore, to optimize system performance when a basic PRU size is (18, 6), it is preferable to sub-channelize the basic PRU into three (3) MRUs in frequency axis.

Figure 8:
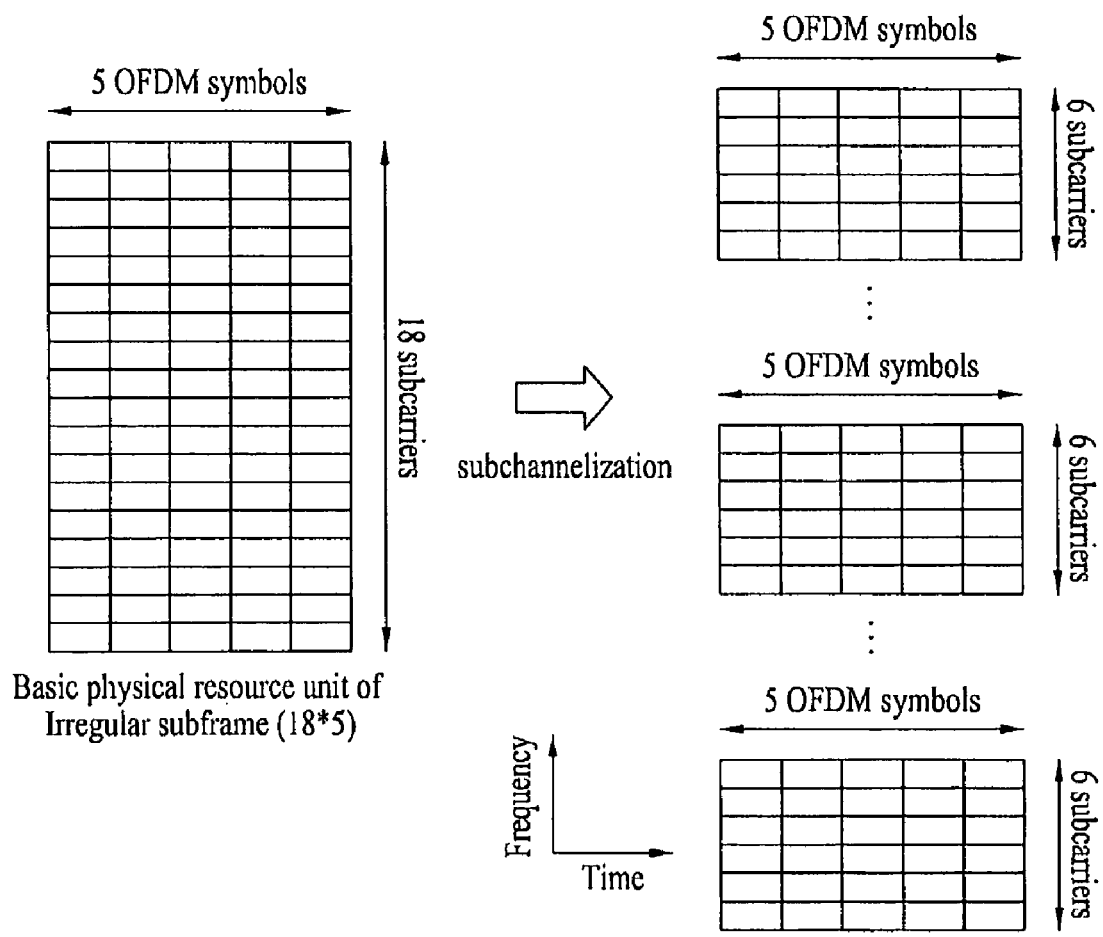
FIG. 8 and FIG. 9 show other structures of a MRU for a basic PRU of irregular sub-frame according to one embodiment of the present invention.
Figure 9:
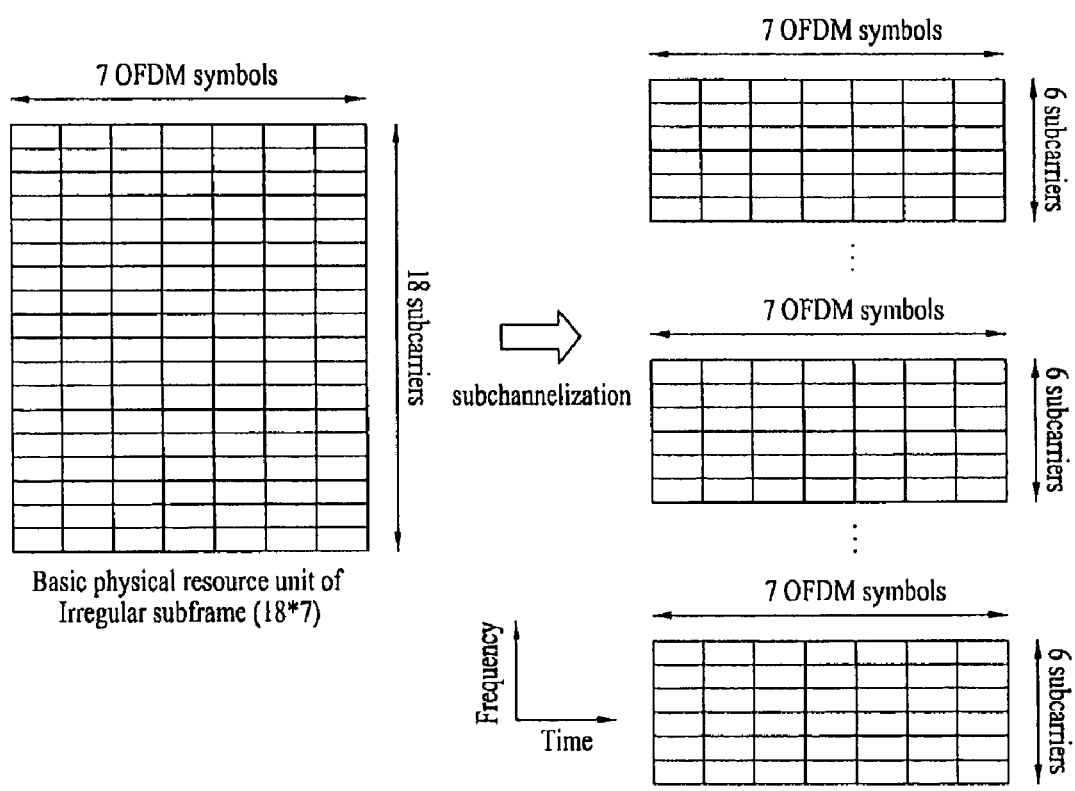

FIG. 8 and FIG. 9 illustrate other structures of a MRU for a basic PRU of irregular sub-frame according to one embodiment of the present invention, respectively.

In FIG. 8, the sub-channelization method is same as in FIG. 7 except that the basic PRU and the MRU consist of 5 OFDMA symbols, respectively.

In FIG. 9, the sub-channelization method is same as in FIG. 7 except that the basic PRU and the MRU consist of 7 OFDMA symbols, respectively.

Referring to FIG. 8 and FIG. 9, it is shown that a MRU consists of 30 or 42 tones (=6*5 or 6*7), respectively.

Figure 10:
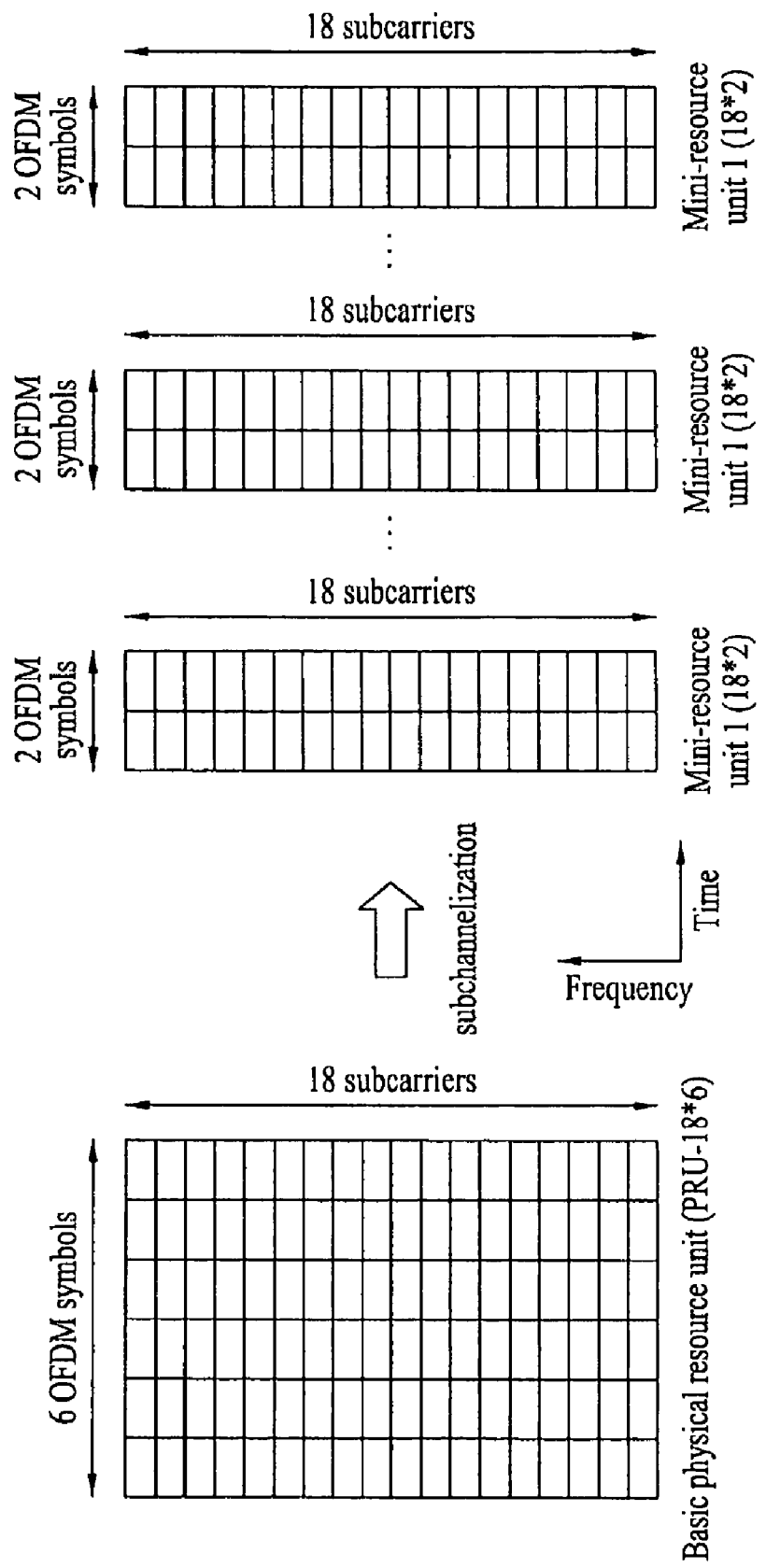
FIG. 10 illustrates another structure of a MRU for a basic PRU of regular sub-frame according to one embodiment of the present invention.

FIG. 10 illustrates another structure of a MRU for a basic PRU of regular sub-frame according to one embodiment of the present invention.

In this embodiment, a basic PRU preferably consists of 18 sub-carriers by 6 OFDMA symbols. The basic PRU consists of three (3) MRUs which are adjacent to each other in time axis. All of the three (3) MRUs have the same size of (18, 2) in this embodiment. Referring to FIG. 10, it is shown that a MRU consists of 36 tones (=18*2).

On the other hand, it is possible to divide the basic PRU of size (18, 6) into two (2) MRUs of size (18, 3). However, in this case, enough time diversity may not be obtained. Therefore, to optimize system performance when a basic PRU size is (18, 6), it is preferable to sub-channelize the basic PRU into three (3) MRUs in time axis.

Figure 11:
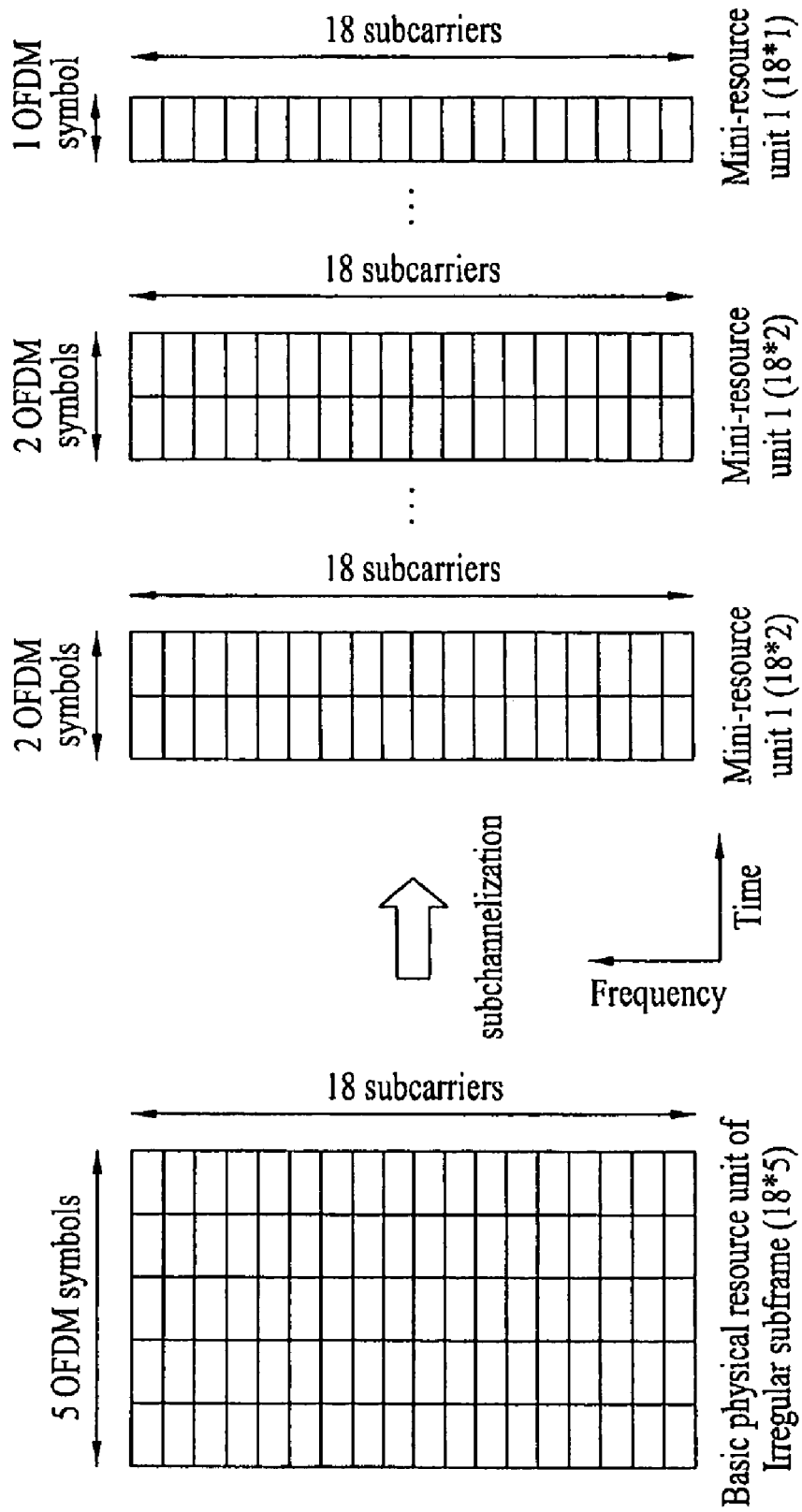
FIG. 11 illustrates another structure of a MRU for a basic PRU of irregular sub-frame according to one embodiment of the present invention.

FIG. 11 illustrates other structure of a MRU for a basic PRU of irregular sub-frame according to other embodiment of the present invention.

In this embodiment, a basic PRU preferably consists of 18 sub-carriers by 5 OFDMA symbols. The basic PRU consists of three (3) MRUs which are adjacent to each other in time axis. Although it is preferable to make all of the three (3) MRUs in the basic PRU to have the same size, this is not possible for an irregular sub-frame consisting of five (5) OFDMA symbols. Therefore, two (2) of the MRUs have a size of (18, 2) and remaining one (1) of the MRUs has a size of (18, 1) in this embodiment. Referring to FIG. 11, it is shown that a MRU consists of 36 or 18 tones (=18*2 or 18*1), respectively.

On the other hand, it is possible to divide the basic PRU of size (18, 5) into two (2) MRUs of size (18, 3) and size (18, 2). However, in this case, enough time diversity may not be obtained. Therefore, to optimize system performance when a basic PRU size is (18, 5), it is preferable to sub-channelize the basic PRU into three (3) MRUs in time axis like this embodiment.

Figure 12:
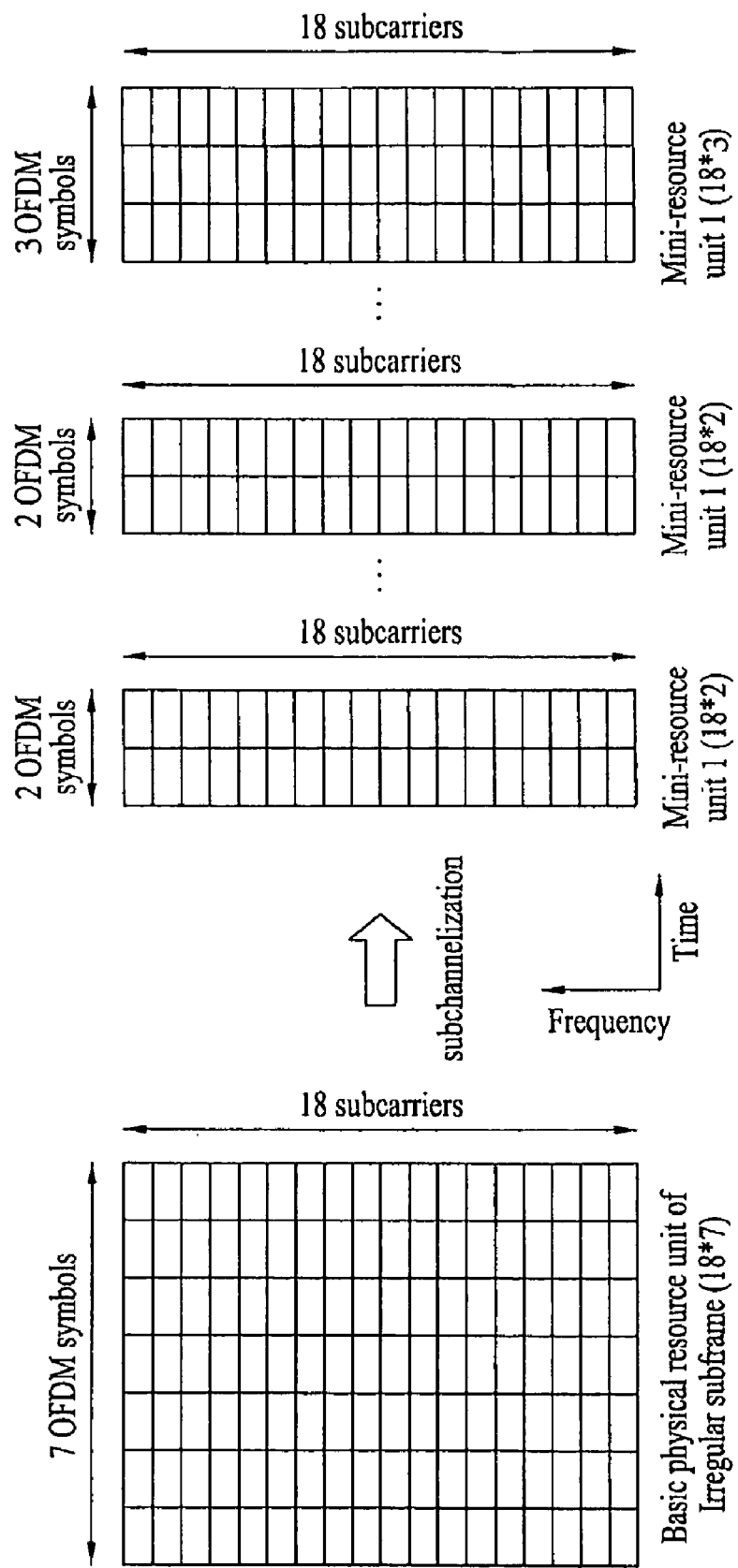
FIG. 12 illustrates another structure of a MRU for a basic PRU of irregular sub-frame according to one embodiment of the present invention.

FIG. 12 illustrates another structure of a MRU for a basic PRU of irregular sub-frame according to one embodiment of the present invention.

In this embodiment, a basic PRU preferably consists of 18 sub-carriers by 7 OFDMA symbols. The basic PRU consists of three (3) MRUs which are adjacent to each other in time axis. Although it is preferable to make all of the three (3) MRUs in the basic PRU to have the same size, this is not possible for an irregular sub-frame consisting of seven (7) OFDMA symbols. Therefore, two (2) of the MRUs have a size of (18, 2) and remaining one (1) of the MRUs has a size of (18, 3) in this embodiment. Referring to FIG. 12, it is shown that a MRU consists of 36 or 54 tones (=18*2 or 18*3), respectively.

On the other hand, it is possible to divide the basic PRU of size (18, 7) into two (2) MRUs of size (18, 4) and size (18, 3). However, in this case, enough time diversity may not be obtained. Therefore, to optimize system performance when a basic PRU size is (18, 7), it is preferable to sub-channelize the basic PRU into three (3) MRUs in time axis like this embodiment.

As discussed above, MIMO (Multiple Input Multiple Output) methods such as SFBC/STBC may be implemented with the MRU structures of FIG. 10, FIG. 11, and FIG. 12 because each of the MRUs has enough length in frequency axis accordingly.

In one embodiment of the present invention, the previously described physical resource unit (PRU) is transmitted by a base station to a mobile station. In another embodiment, the previously described physical resource unit (PRU) is transmitted by a mobile station to a base station.

Figure 13:
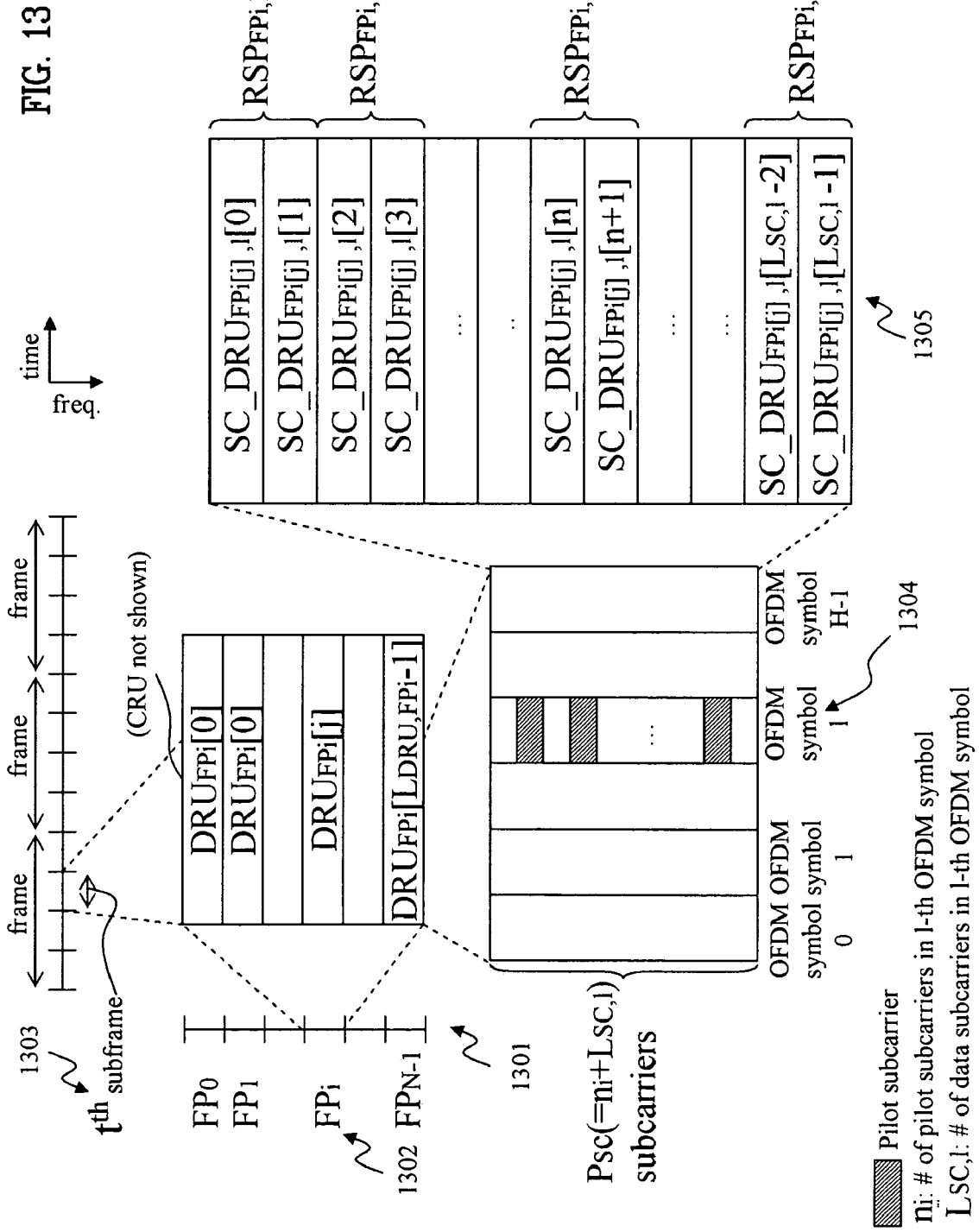
FIG. 13 is a diagram showing a frame structure according to one embodiment of the present invention.

FIG. 13 is a diagram showing a frame structure according to one embodiment of the present invention.

In this embodiment, the system band 1301 is divided into N number of frequency partitions $FP_0, FP_1, \ldots, FP_i, \ldots, FP_{N-1}$. The frequency partitions may be used for fractional frequency reuse or other purposes. Frequency partition $FP_i$ 1302 comprises $L_{DRU,Fpi}$ number of distributed resource units $DRU_{FPi}$ [j] (j=0 to $L_{DRU,FPi}-1$) and/or at least one localized resource units although not shown in FIG. 13. The time duration of $DRU_{FPi}$[j] may be the same as or shorter than the time duration of a subframe, a plurality of which constituting a frame. In this embodiment, the time duration of $DRU_{FPi}$[j] is the same as or shorter than the time duration of a subframe. However, it should be understood that the present invention is also applicable when the time duration of $DRU_{FPi}$[j] is shorter than the time duration of a subframe. t-th subframe and $DRU_{FPi}$[j] is comprised of H number of OFDMA symbols. l-th OFDM symbol 1304 is comprised of total Psc number of subcarriers, including $n_l$ number of pilot subcarriers and $L_{SC,l}$ (=Psc−$n_l$) number of data subcarriers. Without the $n_l$ number of pilot subcarriers, l-th OFDM symbol 1304 can be re-drawn as block 1305. $SC\_DRU_{FPi[j],l}[n]$ (n=0, ..., $L_{SC,l}-1$) in block 1305 indicates n-th subcarrier of l-th OFDM symbol of j-th DRU of i-th frequency partition of the system band.

Figure 14:
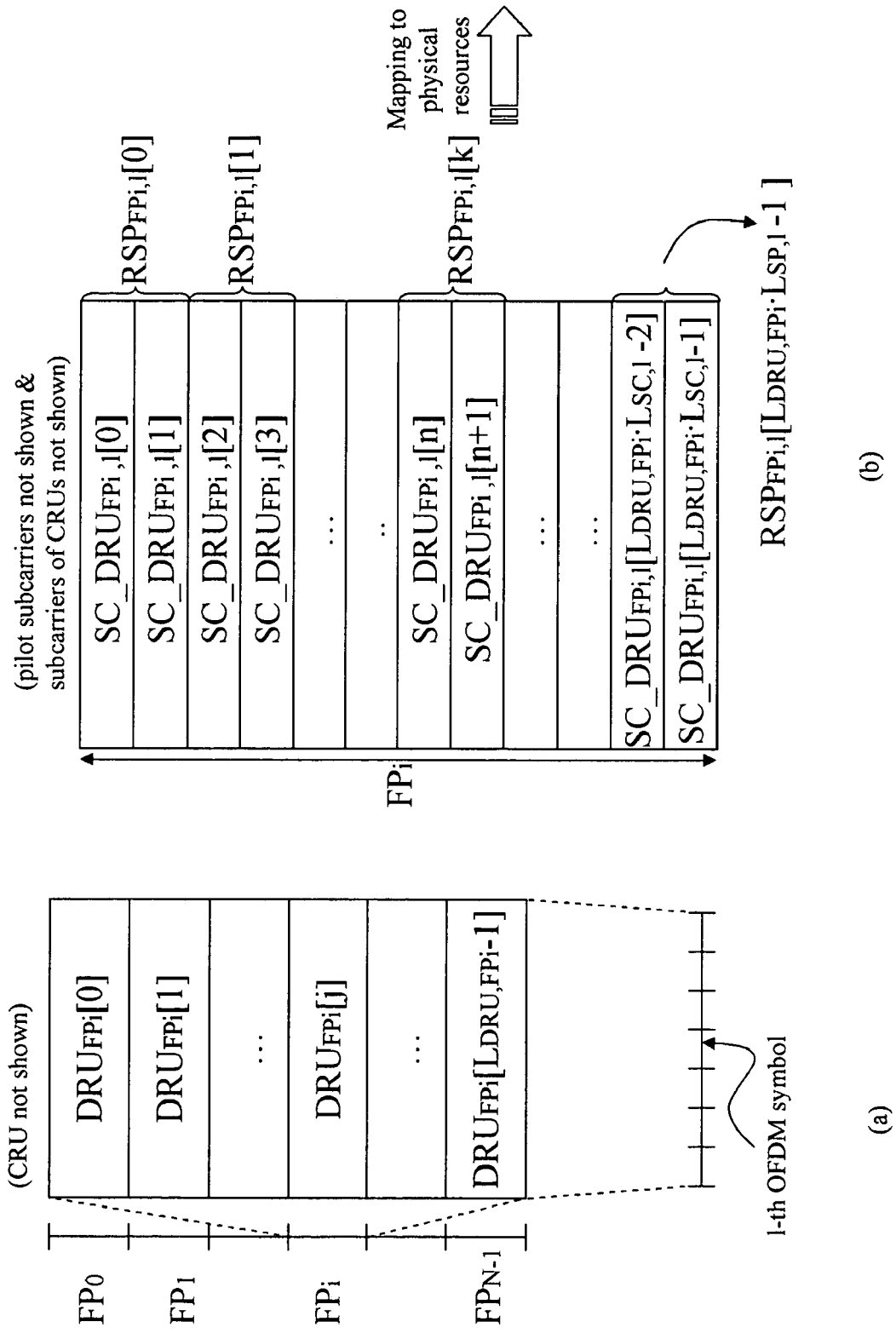
FIG. 14 is a diagram showing a subcarrier-to-DRU mapping according to one embodiment of the present invention.

FIG. 14 is a diagram showing subcarrier-to-DRU mapping according to one embodiment of the present invention.

FIG. 14(b) shows data subcarriers of l-th OFDM symbol of the whole DRUs included in frequency partition $FP_i$ as shown in FIG. 14(a). Because each DRU includes $L_{SC,l}$ number of data subcarriers, frequency partition $FP_i$ includes $L_{DRU,FPi} \cdot L_{SC,l}$ number of data subcarriers in total. The $L_{DRU,FPi} \cdot L_{SC,l}$ number of subcarriers are renumbered in order from index 0 to $L_{DRU,FPi} \cdot L_{SC,l} - 1$. Then, these contiguous and logically renumbered data subcarrier subcarriers are grouped into $L_{DRU,FPi} \cdot L_{SP,l}$ pairs and renumber them from 0 to $L_{DRU,Fpi} \cdot L_{SP,l} - 1$, where $L_{SP,l} = L_{SC,l}/2$. Each renumbered data subcarrier pair is denoted by $RSP_{FPi,l}[u]$ that indicates the subcarrier pair with index $\{SC\_DRU_{FPi[j],l}[2v], SC\_DRU_{FPi[j],l}[2v+1]\}$, where, $0 <= u < L_{DRU,FPi} \cdot L_{SP,l}$, $j = \mathrm{floor}(u/L_{SP,l})$ and $v = u \bmod L_{SP,l}$.

FIG. 13 and FIG. 14 illustrate logical domain of the frame structure according to the present invention. The paired subcarriers $RSP_{FPi,l}[u]$ may be distributed and mapped to distributed LRUs of frequency partition $FP_i$ by a predetermined permutation formula. The distributed LRUs, which correspond to corresponding PRUs in physical domain, may be exchanged between a base station and a mobile communication terminal.

According to one embodiment of the present invention, the predetermined permutation formula is given by $SC\_DRU_{FPi[j],l}[m]\ RSP_{FPi,l}[k]$, and k is $L_{DRU,FPi} \cdot f(m, s) + g(\mathrm{PermSeq}(\ ), s, m, l, t)$ where is the m-th subcarrier pair in the l-th OFDMA symbol in the s-th distributed LRU of the t-th subframe and m is the subcarrier pair index, 0 to $L_{SP,l} - 1$ and t is the subframe index with respect to the frame.

Figure 6B:
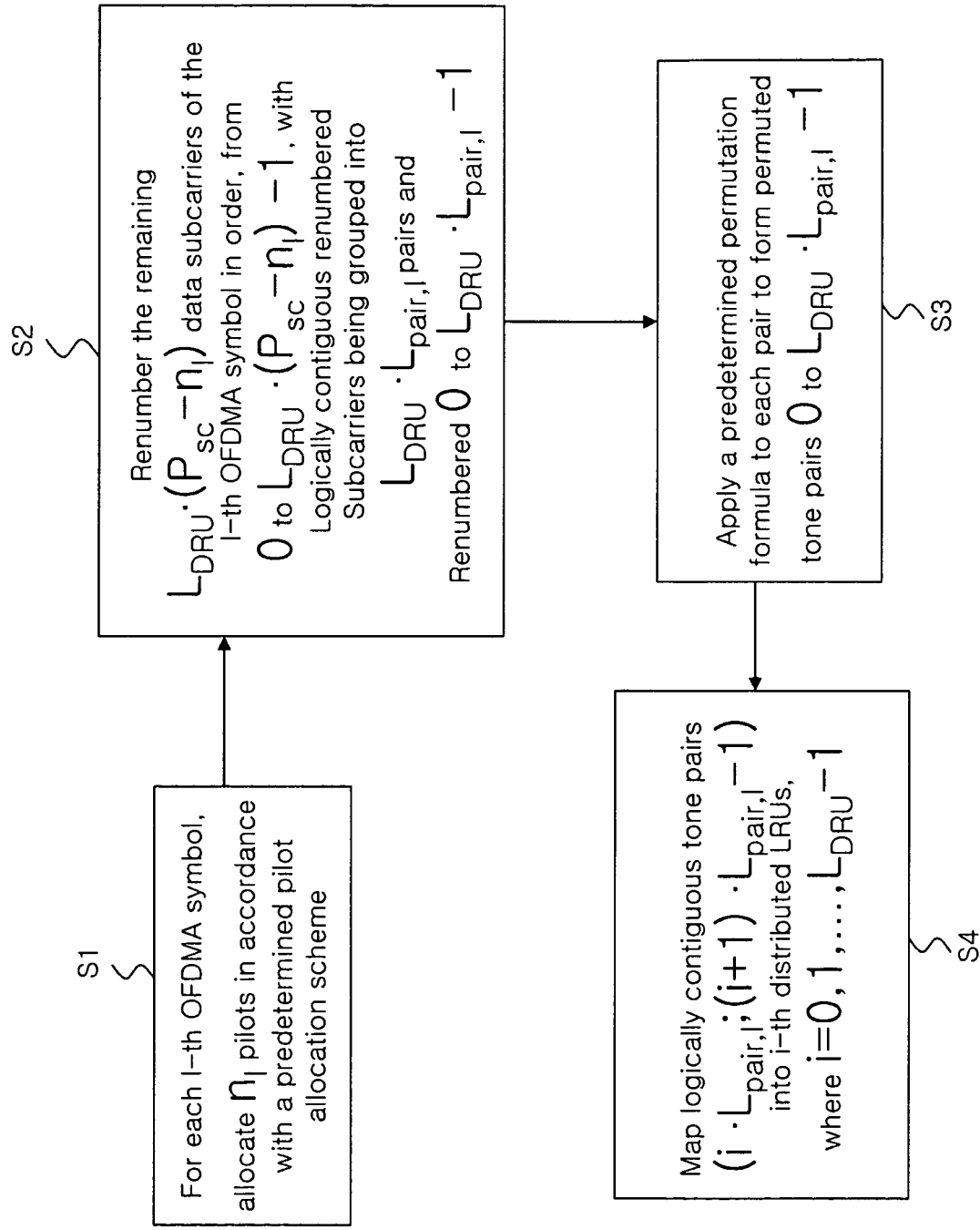
FIG. 6B illustrates a method for forming the structures shown in FIG. 6A.
Figure 15:
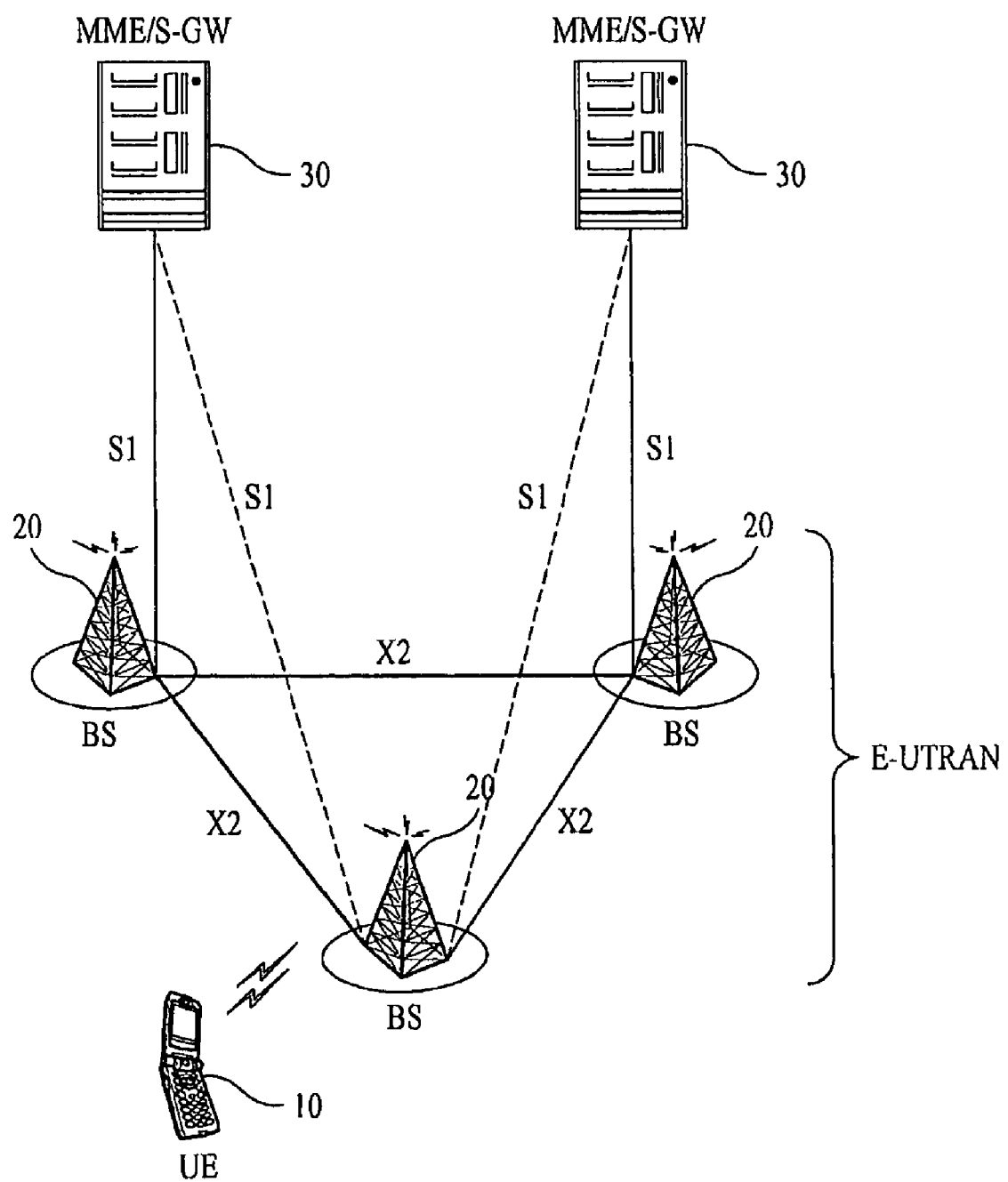
FIG. 15 shows a structure of a wireless communication system capable of exchanging the data structures of FIGS. 2-14.

FIG. 15 shows a structure of a wireless communication system capable of exchanging the data structures of FIGS. 2-14, including the method of FIG. 6B. The wireless communication system may have a network structure of an evolved-universal mobile telecommunications system (E-UMTS). The E-UMTS may also be referred to as a long term evolution (LTE) system. The wireless communication system can be widely deployed to provide a variety of communication services, such as voices, packet data, etc.

Referring to FIG. 15, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 16:
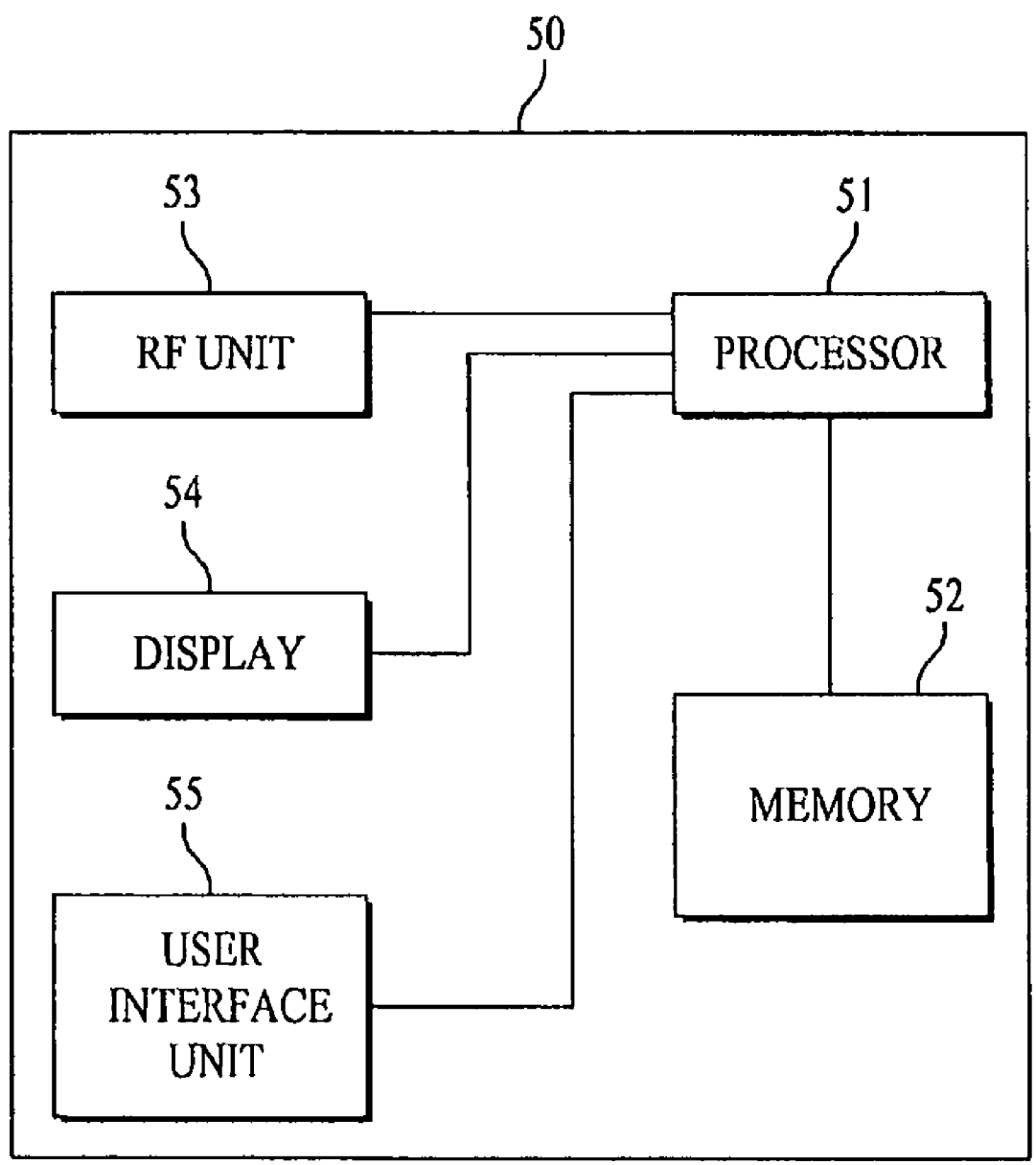
FIG. 16 is a block diagram showing constitutional elements of a communication device capable of exchanging the data structures of FIGS. 2-14.

FIG. 16 is a block diagram showing constitutional elements of a device 50, that can be either the UE or the BS of FIG. 15, and that is capable of exchanging the data structures of FIGS. 2-14. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to a wideband wireless mobile communication system supporting SFBC.

What is claimed is:

1. A method of transmitting signals by a base station in a wireless communication system, comprising:
    transmitting one or more resource units from the base station to a mobile station, each resource unit consisting of 18 subcarriers by a plurality of Orthogonal Frequency Division Multiple Access (OFDMA) symbols,
    wherein the one or more resource units are permutated using X contiguous subcarriers as a permutation unit in each OFDMA symbol, and
    wherein X is a positive integer that is a multiple of 2 as well as a divisor of 18.

2. The method of claim 1, wherein X is 2 or 6.

3. The method of claim 2, wherein X is 2.

4. The method of claim 1, wherein each resource unit consists of 5, 6 or 7 OFDMA symbols.

5. The method of claim 1, wherein the resource unit comprises a physical resource unit, PRU.

6. A method of receiving signals by a mobile station from a base station in a wireless communication system, comprising:
    receiving, by the mobile station, one or more resource units from the base station, each resource unit consisting of 18 subcarriers by a plurality of Orthogonal Frequency Division Multiple Access (OFDMA) symbols,
    wherein the one or more resource units are permutated using X contiguous subcarriers as a permutation unit in each OFDMA symbol, and
    wherein X is a positive integer that is a multiple of 2 as well as a divisor of 18.

7. The method of claim 6, wherein X is 2 or 6.

8. The method of claim 7, wherein X is 2.

9. The method of claim 6, wherein each resource unit consists of 5, 6 or 7 OFDMA symbols.

10. The method of claim 6, wherein the resource unit comprises a physical resource unit, PRU.

11. A device configured to transmit signals in a wireless communication system, the device comprising:
   a memory; and
   a processor operatively connected to the memory and configured to transmit one or more resource units, each resource unit consisting of 18 subcarriers by a plurality of Orthogonal Frequency Division Multiple Access (OFDMA) symbols,
   wherein the one or more resource units are permutated using X contiguous subcarriers as a permutation unit in each OFDMA symbol, and
   wherein X is a positive integer that is a multiple of 2 as well as a divisor of 18.

12. The device of claim 11, wherein X is 2 or 6.

13. The device of claim 12, wherein X is 2.

14. The device of claim 11, wherein each resource unit consists of 5, 6 or 7 OFDMA symbols.

15. The device of claim 11, wherein the resource unit comprises a physical resource unit, PRU.

16. A device configured to receive signals in a wireless communication system, the device comprising:
   a memory; and
   a processor operatively connected to the memory and configured to receive one or more resource units, each resource unit consisting of 18 subcarriers by a plurality of Orthogonal Frequency Division Multiple Access (OFDMA) symbols,
   wherein the one or more resource units are permutated using X contiguous subcarriers as a permutation unit in each OFDMA symbol, and
   wherein X is a positive integer that is a multiple of 2 as well as a divisor of 18.

17. The device of claim 16, wherein X is 2 or 6.

18. The device of claim 17, wherein X is 2.

19. The device of claim 16, wherein each resource unit consists of 5, 6 or 7 OFDMA symbols.

20. The device of claim 16, wherein the resource unit comprises a physical resource unit, PRU.

* * * * *